(12) United States Patent
York

(10) Patent No.: US 8,942,940 B2
(45) Date of Patent: Jan. 27, 2015

(54) PORTABLE ARTICULATED ARM COORDINATE MEASURING MACHINE AND INTEGRATED ELECTRONIC DATA PROCESSING SYSTEM

(75) Inventor: Frederick John York, Longwood, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 1050 days.

(21) Appl. No.: 13/006,564

(22) Filed: Jan. 14, 2011

(65) Prior Publication Data

US 2011/0178755 A1    Jul. 21, 2011

Related U.S. Application Data

(60) Provisional application No. 61/296,555, filed on Jan. 20, 2010.

(51) Int. Cl.
  *G01B 5/008* (2006.01)
  *G06F 15/00* (2006.01)
  (Continued)

(52) U.S. Cl.
  CPC .............. *G05B 19/401* (2013.01); *G01B 5/012* (2013.01); *G01B 11/007* (2013.01);
  (Continued)

(58) Field of Classification Search
  USPC .......................................................... 702/95
  See application file for complete search history.

(56) References Cited

U.S. PATENT DOCUMENTS

| 1,535,312 | A | 4/1925 | Hosking |
| 1,918,813 | A | 7/1933 | Kinzy |

(Continued)

FOREIGN PATENT DOCUMENTS

| CN | 2236119 | 9/1996 |
| CN | 2508896 | 9/2002 |

(Continued)

OTHER PUBLICATIONS

International Preliminary Report on Patentability for International Patent Serial No. PCT/US2011/021253; Date of Completion May 9, 2012.

(Continued)

*Primary Examiner* — Patrick Assouad
*Assistant Examiner* — Haidong Zhang
(74) *Attorney, Agent, or Firm* — Cantor Colburn LLP

(57) ABSTRACT

Implementing a portable articulated arm coordinate measuring machine includes receiving a first request to perform a function. The portable AACMM includes a manually positionable articulated arm portion having opposed first and second ends, the arm portion including a plurality of connected arm segments, each arm segment including at least one position transducer for producing a position signal, a measurement device attached to a first end of the AACMM, and an electronic circuit which receives the position signals from the transducers and provides data corresponding to a position of the measurement device. Implementing the portable articulated arm coordinate measuring machine also includes identifying a source device from which the first request is received, implementing the function pursuant to the first request, selecting a destination device as the source device of the first request by identifying from which of a first and second port the first request is received, and transmitting information derived from implementing the function to the destination device.

17 Claims, 11 Drawing Sheets

(51) Int. Cl.
  *G06F 19/00* (2011.01)
  *G05B 19/401* (2006.01)
  *G01B 5/012* (2006.01)
  *G01B 11/00* (2006.01)
  *G01B 21/04* (2006.01)
  *G05B 19/406* (2006.01)

(52) U.S. Cl.
  CPC ........... *G01B 21/047* (2013.01); *G05B 19/406* (2013.01); *G05B 2219/24067* (2013.01); *G05B 2219/37193* (2013.01); *G05B 2219/40233* (2013.01); *G05B 2219/40596* (2013.01); *G05B 2219/45061* (2013.01)
  USPC .................. 702/95; 702/152; 33/502; 33/503

(56) References Cited

U.S. PATENT DOCUMENTS

| | | | |
|---|---|---|---|
| 2,316,573 A | 4/1943 | Egy | |
| 2,333,243 A | 11/1943 | Glab | |
| 2,702,683 A | 2/1955 | Green et al. | |
| 2,748,926 A | 6/1956 | Leahy | |
| 2,924,495 A | 2/1960 | Haines | |
| 2,966,257 A | 12/1960 | Littlejohn | |
| 2,983,367 A | 5/1961 | Paramater et al. | |
| 3,066,790 A | 12/1962 | Armbruster | |
| 3,458,167 A | 7/1969 | Cooley, Jr. | |
| 4,138,045 A | 2/1979 | Baker | |
| 4,178,515 A | 12/1979 | Tarasevich | |
| 4,340,008 A | 7/1982 | Mendelson | |
| 4,379,461 A | 4/1983 | Nilsson et al. | |
| 4,424,899 A | 1/1984 | Rosenberg | |
| 4,430,796 A | 2/1984 | Nakagawa | |
| 4,457,625 A | 7/1984 | Greenleaf et al. | |
| 4,506,448 A | 3/1985 | Topping et al. | |
| 4,537,233 A | 8/1985 | Vroonland et al. | |
| 4,561,776 A | 12/1985 | Pryor | |
| 4,606,696 A | 8/1986 | Slocum | |
| 4,659,280 A | 4/1987 | Akeel | |
| 4,663,852 A | 5/1987 | Guarini | |
| 4,664,588 A | 5/1987 | Newell et al. | |
| 4,676,002 A | 6/1987 | Slocum | |
| 4,714,339 A | 12/1987 | Lau et al. | |
| 4,751,950 A | 6/1988 | Bock | |
| 4,767,257 A | 8/1988 | Kato | |
| 4,790,651 A | 12/1988 | Brown et al. | |
| 4,816,822 A | 3/1989 | Vache et al. | |
| 4,882,806 A | 11/1989 | Davis | |
| 4,954,952 A | 9/1990 | Ubhayakar et al. | |
| 4,982,841 A | 1/1991 | Goedecke | |
| 4,996,909 A | 3/1991 | Vache et al. | |
| 5,025,966 A | 6/1991 | Potter | |
| 5,027,951 A | 7/1991 | Johnson | |
| 5,068,971 A | 12/1991 | Simon | |
| 5,069,524 A | 12/1991 | Watanabe et al. | |
| 5,189,797 A | 3/1993 | Granger | |
| 5,205,111 A | 4/1993 | Johnson | |
| 5,211,476 A | 5/1993 | Coudroy | |
| 5,213,240 A | 5/1993 | Dietz et al. | |
| 5,219,423 A | 6/1993 | Kamaya | |
| 5,239,855 A | 8/1993 | Schleifer et al. | |
| 5,289,264 A | 2/1994 | Steinbichler | |
| 5,319,445 A | 6/1994 | Fitts | |
| 5,332,315 A | 7/1994 | Baker et al. | |
| 5,372,250 A | 12/1994 | Johnson | |
| 5,373,346 A | 12/1994 | Hocker | |
| 5,402,582 A | 4/1995 | Raab | |
| 5,412,880 A | 5/1995 | Raab | |
| 5,430,384 A | 7/1995 | Hocker | |
| 5,455,670 A | 10/1995 | Payne et al. | |
| 5,455,993 A | 10/1995 | Link et al. | |
| 5,510,977 A | 4/1996 | Raab | |
| 5,528,505 A | 6/1996 | Granger et al. | |
| 5,535,524 A | 7/1996 | Carrier et al. | |
| 5,611,147 A | 3/1997 | Raab | |
| 5,623,416 A | 4/1997 | Hocker, III | |
| 5,682,508 A | 10/1997 | Hocker, III | |
| 5,724,264 A | 3/1998 | Rosenberg et al. | |
| 5,752,112 A | 5/1998 | Paddock et al. | |
| 5,754,449 A | 5/1998 | Hoshal et al. | |
| 5,768,792 A | 6/1998 | Raab | |
| 5,825,666 A | 10/1998 | Freifeld | |
| 5,829,148 A | 11/1998 | Eaton | |
| 5,832,416 A | 11/1998 | Anderson | |
| 5,856,874 A | 1/1999 | Tachibana et al. | |
| 5,887,122 A | 3/1999 | Terawaki et al. | |
| 5,926,782 A | 7/1999 | Raab | |
| 5,956,857 A | 9/1999 | Raab | |
| 5,973,788 A | 10/1999 | Pettersen et al. | |
| 5,978,748 A | 11/1999 | Raab | |
| 5,983,936 A | 11/1999 | Schwieterman et al. | |
| 5,996,790 A | 12/1999 | Yamada et al. | |
| 5,997,779 A | 12/1999 | Potter | |
| D423,534 S | 4/2000 | Raab et al. | |
| 6,050,615 A | 4/2000 | Weinhold | |
| 6,060,889 A | 5/2000 | Hocker | |
| 6,067,116 A | 5/2000 | Yamano et al. | |
| 6,125,337 A | 9/2000 | Rosenberg et al. | |
| 6,131,299 A | 10/2000 | Raab et al. | |
| 6,134,507 A | 10/2000 | Markey, Jr. et al. | |
| 6,151,789 A | 11/2000 | Raab et al. | |
| 6,163,294 A | 12/2000 | Talbot | |
| 6,166,504 A | 12/2000 | Iida et al. | |
| 6,166,809 A | 12/2000 | Pettersen et al. | |
| 6,166,811 A | 12/2000 | Long et al. | |
| 6,219,928 B1 * | 4/2001 | Raab et al. | 33/503 |
| D441,632 S | 5/2001 | Raab et al. | |
| 6,240,651 B1 | 6/2001 | Schroeder et al. | |
| 6,253,458 B1 | 7/2001 | Raab et al. | |
| 6,282,195 B1 | 8/2001 | Miller et al. | |
| 6,298,569 B1 | 10/2001 | Raab et al. | |
| 6,339,410 B1 | 1/2002 | Milner et al. | |
| 6,366,831 B1 | 4/2002 | Raab | |
| 6,408,252 B1 | 6/2002 | De Smet | |
| 6,418,774 B1 | 7/2002 | Brogaardh et al. | |
| 6,438,856 B1 | 8/2002 | Kaczynski | |
| 6,442,419 B1 | 8/2002 | Chu et al. | |
| 6,460,004 B2 | 10/2002 | Greer et al. | |
| 6,470,584 B1 | 10/2002 | Stoodley | |
| 6,477,784 B2 | 11/2002 | Schroeder et al. | |
| 6,519,860 B1 | 2/2003 | Bieg et al. | |
| D472,824 S | 4/2003 | Raab et al. | |
| 6,547,397 B1 | 4/2003 | Kaufman et al. | |
| 6,598,306 B2 | 7/2003 | Eaton | |
| 6,611,346 B2 | 8/2003 | Granger | |
| 6,611,617 B1 | 8/2003 | Crampton | |
| 6,612,044 B2 | 9/2003 | Raab et al. | |
| 6,621,065 B1 | 9/2003 | Fukumoto et al. | |
| 6,626,339 B2 | 9/2003 | Gates et al. | |
| 6,633,051 B1 | 10/2003 | Holloway et al. | |
| 6,668,466 B1 | 12/2003 | Bieg et al. | |
| D491,210 S | 6/2004 | Raab et al. | |
| 6,764,185 B1 | 7/2004 | Beardsley et al. | |
| 6,789,327 B2 | 9/2004 | Roth et al. | |
| 6,820,346 B2 | 11/2004 | Raab et al. | |
| 6,822,749 B1 | 11/2004 | Christoph | |
| 6,826,664 B2 | 11/2004 | Hocker, III et al. | |
| 6,868,359 B2 | 3/2005 | Raab | |
| 6,879,933 B2 | 4/2005 | Steffey et al. | |
| 6,892,465 B2 | 5/2005 | Raab et al. | |
| 6,895,347 B2 | 5/2005 | Dorny et al. | |
| 6,901,673 B1 | 6/2005 | Cobb et al. | |
| 6,904,691 B2 | 6/2005 | Raab et al. | |
| 6,920,697 B2 | 7/2005 | Raab et al. | |
| 6,925,722 B2 | 8/2005 | Raab et al. | |
| 6,931,745 B2 | 8/2005 | Granger | |
| 6,935,036 B2 | 8/2005 | Raab et al. | |
| 6,935,748 B2 | 8/2005 | Kaufman et al. | |
| 6,948,255 B2 | 9/2005 | Russell | |
| 6,965,843 B2 | 11/2005 | Raab et al. | |
| 7,003,892 B2 | 2/2006 | Eaton et al. | |
| 7,006,084 B1 | 2/2006 | Buss et al. | |
| 7,024,032 B2 | 4/2006 | Kidd et al. | |
| 7,032,321 B2 | 4/2006 | Raab et al. | |

(56) References Cited

U.S. PATENT DOCUMENTS

| | | | |
|---|---|---|---|
| 7,040,136 B2 | 5/2006 | Forss et al. |
| 7,051,447 B2 | 5/2006 | Kikuchi et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,430,068 B2 | 9/2008 | Becker et al. |
| 7,441,341 B2 | 10/2008 | Eaton |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| D607,350 S | 1/2010 | Cooduvalli et al. |
| 7,656,751 B2 | 2/2010 | Rischar et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 | 3/2011 | Ferrari |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 8,171,650 B2 | 5/2012 | York et al. |
| 8,276,286 B2 | 10/2012 | Bailey et al. |
| 8,284,407 B2 | 10/2012 | Briggs et al. |
| 8,352,212 B2 | 1/2013 | Fetter et al. |
| 8,533,967 B2 | 9/2013 | Bailey et al. |
| 8,537,374 B2 | 9/2013 | Briggs et al. |
| 8,619,265 B2 | 12/2013 | Steffey et al. |
| 8,677,643 B2 | 3/2014 | Bridges et al. |
| 8,683,709 B2 | 4/2014 | York |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1* | 11/2002 | Steffey et al. ............ 33/503 |
| 2003/0002055 A1 | 1/2003 | Kilthau et al. |
| 2003/0033104 A1 | 2/2003 | Gooche |
| 2003/0053037 A1 | 3/2003 | Blaesing-Bangert et al. |
| 2003/0125901 A1* | 7/2003 | Steffey et al. ............ 702/155 |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker, III et al. |
| 2004/0162700 A1 | 8/2004 | Rosenberg et al. |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0082262 A1 | 4/2005 | Rueb et al. |
| 2005/0085940 A1 | 4/2005 | Griggs et al. |
| 2005/0115092 A1 | 6/2005 | Raab et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0123649 A1 | 6/2006 | Muller |
| 2006/0129349 A1 | 6/2006 | Raab et al. |
| 2006/0169050 A1 | 8/2006 | Kobayashi et al. |
| 2006/0169608 A1 | 8/2006 | Carnevali |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |

(56) References Cited

U.S. PATENT DOCUMENTS

| | | |
|---|---|---|
| 2007/0151390 A1 | 7/2007 | Blumenkranz et al. |
| 2007/0153297 A1 | 7/2007 | Lau |
| 2007/0163134 A1 | 7/2007 | Eaton |
| 2007/0163136 A1 | 7/2007 | Eaton |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 * | 12/2007 | Atwell et al. .................. 702/95 |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2009/0000136 A1 | 1/2009 | Crampton |
| 2009/0016475 A1 | 1/2009 | Rischar et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0083985 A1 | 4/2009 | Ferrari |
| 2009/0089004 A1 | 4/2009 | Vook et al. |
| 2009/0089078 A1 | 4/2009 | Byrsey |
| 2009/0089233 A1 | 4/2009 | Gach et al. |
| 2009/0089623 A1 | 4/2009 | Neering et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0139105 A1 | 6/2009 | Granger |
| 2009/0157419 A1 | 6/2009 | Bursey |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0299689 A1 | 12/2009 | Stubben |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0148013 A1 | 6/2010 | Bhotika et al. |
| 2010/0208062 A1 | 8/2010 | Pettersson |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0094908 A1 | 4/2011 | Trieu |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0123097 A1 | 5/2011 | Van Coppenolle |
| 2011/0164114 A1 | 7/2011 | Kobayashi et al. |
| 2011/0173827 A1 | 7/2011 | Bailey et al. |
| 2011/0173828 A1 | 7/2011 | York |
| 2011/0178755 A1 | 7/2011 | York |
| 2011/0178758 A1 | 7/2011 | Atwell et al. |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari |
| 2011/0273568 A1 | 11/2011 | Lagassey |
| 2012/0181194 A1 | 7/2012 | McEwan et al. |
| 2012/0210678 A1 | 8/2012 | Alcouloumre et al. |
| 2012/0260512 A1 | 10/2012 | Kretschmer et al. |
| 2012/0260611 A1 | 10/2012 | Jones |
| 2013/0025143 A1 | 1/2013 | Bailey et al. |
| 2013/0025144 A1 | 1/2013 | Briggs et al. |
| 2013/0062243 A1 | 3/2013 | Chang et al. |
| 2013/0097882 A1 | 4/2013 | Bridges et al. |
| 2013/0125408 A1 | 5/2013 | Atwell et al. |
| 2013/0205606 A1 | 8/2013 | Briggs et al. |
| 2013/0212889 A9 | 8/2013 | Bridges et al. |
| 2013/0222816 A1 | 8/2013 | Briggs et al. |
| 2014/0002608 A1 | 1/2014 | Atwell et al. |

FOREIGN PATENT DOCUMENTS

| | | |
|---|---|---|
| CN | 2665668 | 12/2004 |
| CN | 1630804 A | 6/2005 |
| CN | 1818537 | 8/2006 |
| CN | 101024286 A | 8/2007 |
| CN | 201266071 | 7/2009 |
| DE | 3245060 A1 | 7/1983 |
| DE | 4410775 A1 | 10/1995 |
| DE | 29622033 | 2/1997 |
| DE | 19543763 A1 | 5/1997 |
| DE | 19820307 A1 | 11/1999 |
| DE | 10026357 A1 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006035292 A1 | 1/2008 |
| DE | 102008039838 A1 | 3/2010 |
| DE | 102005036929 B4 | 6/2010 |
| DE | 102008062763 B3 | 7/2010 |

(56) References Cited

FOREIGN PATENT DOCUMENTS

| | | |
|---|---|---|
| DE | 102009001894 | 9/2010 |
| EP | 0546784 A2 | 6/1993 |
| EP | 0730210 | 9/1996 |
| EP | 0730210 A1 | 9/1996 |
| EP | 0614517 | 3/1997 |
| EP | 1160539 | 12/2001 |
| EP | 1189124 | 3/2002 |
| EP | 0767357 B1 | 5/2002 |
| EP | 1361414 A1 | 11/2003 |
| EP | 1452279 | 9/2004 |
| EP | 1468791 A1 | 10/2004 |
| EP | 1669713 A1 | 6/2006 |
| EP | 1734425 A2 | 12/2006 |
| EP | 1429109 B1 | 4/2007 |
| EP | 1764579 B1 | 12/2007 |
| EP | 1878543 | 1/2008 |
| EP | 1967930 A2 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2400261 | 12/2011 |
| FR | 2935043 A1 | 2/2010 |
| GB | 894320 | 4/1962 |
| GB | 2255648 A | 11/1992 |
| GB | 2341203 A | 3/2000 |
| GB | 2420241 A | 5/2006 |
| GB | 2452033 A | 2/2009 |
| JP | 5581525 | 6/1955 |
| JP | 5827264 | 2/1983 |
| JP | 6313710 A | 11/1994 |
| JP | 7210586 A | 8/1995 |
| JP | 2003194526 | 7/2003 |
| JP | 2004257927 A | 9/2004 |
| JP | 2005517908 | 6/2005 |
| JP | 2006203404 A | 8/2006 |
| JP | 2006241833 | 9/2006 |
| JP | 2006301991 A | 11/2006 |
| JP | 2009524057 | 6/2009 |
| WO | 9208568 A1 | 5/1992 |
| WO | 9808050 | 2/1998 |
| WO | 9910706 A1 | 3/1999 |
| WO | 00/14474 A1 | 3/2000 |
| WO | 00/34733 | 6/2000 |
| WO | 0033149 | 6/2000 |
| WO | 02101323 A2 | 12/2002 |
| WO | 2004096502 A1 | 11/2004 |
| WO | 2005/072917 | 8/2005 |
| WO | 2005075875 | 8/2005 |
| WO | 2005100908 A1 | 10/2005 |
| WO | 2006051264 A1 | 5/2006 |
| WO | 2007002319 A1 | 1/2007 |
| WO | 2007/028941 A1 | 3/2007 |
| WO | 2007125081 A1 | 11/2007 |
| WO | 2007144906 A1 | 12/2007 |
| WO | 2008/027588 | 3/2008 |
| WO | 2008/047171 A1 | 4/2008 |
| WO | 2008/064276 A3 | 5/2008 |
| WO | 2008066896 | 6/2008 |
| WO | 2008075170 A1 | 6/2008 |
| WO | 2008157061 A1 | 12/2008 |
| WO | 2009001165 A1 | 12/2008 |
| WO | 2009016185 A1 | 2/2009 |
| WO | 2009083452 | 7/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |
| WO | 2011/057130 A2 | 5/2011 |
| WO | 2012038446 A1 | 3/2012 |

OTHER PUBLICATIONS

German Patent Application No. 11 2011 100 291.2 dated Dec. 20, 2012. All art cited within.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
Examination Report for German Application No. 11 2011 100 193.2 Report dated Dec. 20, 2012; based on PCT/US2011/021249.
FARO Product Catalog; Faro Arm; 68 pages; Faro Technologies Inc. 2009; printed Aug. 3, 2009.
Romer Measuring Arms; Portable CMMs for the shop floor; 20 pages; Hexagon Metrology, Inc. (2009) http//us.ROMER.com.
Dylan, Craig R., "Suspended in MidAir" High Precision Makes the Massive Bay Bridge Project Work—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].
Franklin, Paul F., "What IEEE 1588 Means for Your Next T&M System Design", Keithley Instruments, Inc., [on-line] Oct. 19, 2010, http://www.eetimes.com/General/DisplayPrintViewContent?contentItemId=4209746, [Retrieved Oct. 21, 2010].
HYDROpro Navigation, Hydropgraphic Survey Software, Trimble, www.trimble.com, © 1997-2003.
International Preliminary Report on Patentability for PCT/US2011/021274; Date of Completion Apr. 12, 2012.
Trimble—Trimble SPS630, SPS730 and SPS930 Universal Total Stations, [on-line] http://www.trimble.com/sps630_730_930.shtml (1 of 4), [Retrieved Jan. 26, 2010 8:50:29 AM] .
Written Opinion of the International Searching Authority for International Application No. PCT/US2011/021253 mailed Mar. 22, 2012.
Information on Electro-Optical Information Systems; EOIS 3D Mini-Moire C.M.M. Sensor for Non-Contact Measuring & Surface Mapping; Direct Dimensions, Jun. 1995.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021278 mailed May 25, 2011.
International Search Report for International Application No. PCT/US2011/021263 mailed May 4, 2011.
International Search Report for International Application No. PCT/US2011/021264 mailed May 31, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021278 mailed May 25, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.
Anonymous: "So wird's gemacht: Mit T-DSL und Windows XP Home Edition gemeinsam ins Internet (Teil 3)", Internet Citation, Jul. 2003, XP002364586, Retrieved from the Internet: URL:http://support.microsoft.com/kb/814538/DE/ [retrieved on Jan. 26, 2006] the whole document (English translation not available).
International Search Report for International Application No. PCT/US2013/040309 mailed Jul. 15, 2013.

(56) References Cited

OTHER PUBLICATIONS

Written Opinion for International Application No. PCT/US2013/040309 mailed Jul. 15, 2013.
Examination Report for German Application No. 11 2011 100 290.4 Report dated Jul. 16, 2013; based on PCT/US2011/021247.
Romer "Romer Measuring Arms Portable CMMs for R&D and shop floor" (Mar. 2009) Hexagon Metrology (16 pages).
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021259. International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.
International Search Report of the International Searching Authority for Application No. PCT/US2013/022186; Date of Mailing: May 29, 2013, 4 pages.
Written Opinion of the International Searching Authority for Application No. PCT/US2013/022186; Date of Mailing: May 29, 2013, 4 pages.
Written Opinion of the International Searching Authority for International Application No. PCT/US2011/021252 mailed Apr. 27, 2011.
International Search Report for International Application No. PCT/US2011/021246 mailed Apr. 12, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
Written Opinion of the International Searching Authority for International Application No. PCT/US2011/021246 mailed Apr. 12, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Cho et al., Implementation of a Precision Time Protocol over Low Rate Wireless Personal Area Networks, IEEE, 2008.
Cooklev et al., An Implementation of IEEE 1588 Over IEEE 802.11b for Synchronization of Wireless Local Area Network Nodes, IEEE Transactions on Instrumentation and Measurement, vol. 56, No. 5, Oct. 2007.
International Search Report for International Application No. PCT/2011/020625 mailed Feb. 25, 2011.
International Search Report for International Application No. PCT/US2011/021270 mailed May 2, 2011.
International Search Report for International Application No. PCT2011/021276 filed Jan. 14, 2011.
International Search Report for International Application No. PCT/US2011/021273 filed Jan. 14, 2011.
Jasperneite et al., Enhancements to the Time Synchronization Standard IEEE-1588 for a System of Cascaded Bridges, IEEE, 2004.
Sauter et al., Towards New Hybrid Networks for Industrial Automation, IEEE, 2009.
Spada et al., IEEE 1588 Lowers Integration Costs in Continuous Flow Automated Production Lines, XP-002498255, ARC Insights, Insight # 2003-33MD&H, Aug. 20, 2003.
Written Opinion of the International Searching Authority for International Application No. PCT/US2011/021273 mailed Jan. 14, 2011.
Written Opinion of the International Searching Authority for International Application No. PCT/US2011/020625 mailed Feb. 25, 2011.
Written Opinion of the International Searching Authority for International Application No. PCT/US2011/021270 mailed May 2, 2011.
Written Opinion of the International Searching Authority for International Application No. PCT/US2011/021276 filed Jan. 14, 2011.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
P Ben-Tzvi, et al. "Extraction of 3D Images Using Pitch-Actuated 2D Laser Range Finder for Robotic Vision" (6 pages) BNSDOCID <XP 31840390A_1_>.
International Search Report for International Application No. PCT/US2013/040321 mailed Jul. 15, 2013.
YK Cho, et al. "Light-weight 3D LADAR System for Construction Robotic Operations" (pp. 237-244); 26th International Symposium on Automation and Robotics in Construction (ISARC 2009).
Written Opinion for International Application No. PCT/US2013/040321 mailed Jul. 15, 2013.
J. Geng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE; 15 pages.
International Search Report for International Application No. PCT/US/2013/041826 filed May 20, 2013; mailed Jul. 29, 2013; 5 pages.
Written Opinion for International Application No. PCT/US/2013/041826 filed May 20, 2013; mailed Jul. 29, 2013; 7 pages.
A. Hart, et al.; "Kinematic Coupling Interchangeability" Precision Engineering; vol. 28, No. 1; Jan. 1, 2004 pp. 1-15.
ABB Flexible Automation AB: "Product Manual IRB 6400R 3HAC 6264-1 M99, On-line Manual"; Sep. 13, 2006; XP00002657684; Retrieved from the Internet: URL:http://pergatory.mit.edu/kinematiccouplings/case_studies/ABB_Robotics/general/6400R%20Product%20Manual.pdf (retrieved Aug. 26, 2011).

(56) References Cited

OTHER PUBLICATIONS

International Search Report for International Application No. PCT/US2011/021248 mailed Sep. 19, 2011.
International Search Report for International Application No. PCT/US2011/021253 mailed Sep. 26, 2011.
International Search Report for International Application No. PCT/US2011/021794 mailed Sep. 23, 2011.
P. Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.
Written Opinion of the International Searching Authority for International Application No. PCT/US2011/021248 mailed Sep. 19, 2011.
Written Opinion of the International Searching Authority for International Application No. PCT/US2011/021253 mailed Sep. 26, 2011.
Written Opinion of the International Searching Authority for International Application No. PCT/US2011/021794 mailed Sep. 23, 2011.
International Search Report for International Patent Application PCT/US2011/050787; mailing date Nov. 3, 2011.
International Search Report for International Application No. PCT/US2011/021274; Date of Mailing May 6, 2011.
Romer "Romer Absolute Arm Product Brochure" (2010); Hexagon Metrology; www.hexagonmetrology.com; Hexagon AB 2010.
Romer "Romer Absolute Arm Maximum Performance Portable Measurement" (Printed Oct. 2010); Hexagon Metrology, Inc. http://us:ROMER.com; Hexagon Metrology, Inc 2010.
Written Opinion of the International Searching Authority for International Patent Application PCT/US2011/050787; mailing date Nov. 3, 2011.
Written Opinion of the International Searching Authority for International Application No. PCT/US2011/021274 mailed May 6, 2011.
Examination Report under Section 18(3); Report dated Oct. 31, 2012; Application No. GB1210309.5.
Examination Report under Section 18(3); Report dated Nov. 1, 2012; Application No. GB1210311.5.
Examination Report under Section 18(3); Report dated Nov. 6, 2012; Application No. GB1210306.5.
GoMeasure3D—Your source for all things measurement, Baces 3D 100 Series Portable CMM from GoMeasure3D, [online], [retrieved Nov. 29, 2011], http://www.gomeasure3d.com/baces100.html.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
GHOST 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.
Electro-Optical Information Systems, "The Handy Handheld Digitizer" [online], [retrieved on Nov. 29, 2011], http://vidibotics.com/htm/handy.htm.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
MicroScan 3D User Guide, RSI GmbH, 3D Systems & Software, Oberursel, Germany, email: info@rsi-gmbh.de, © RSI Roland Seifert Imaging GmbH 2008.
Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.
German Office Action and English Language summary for DE 112011100292.0 filed Jul. 3, 2012, based on PCT Application US2011/021252 filed Jan. 14, 2011.
Written Opinion of the International Searching Authority for International Application No. PCT/US2011/021272 mailed Apr. 7, 2011.
International Search Report for International Application No. PCT/US2011/021272 mailed Apr. 7, 2011.
GB Office Action dated Jan. 15, 2014 for SJB/PX210785GB; UK Patent Application No. 1214426.7.
International Search report of the International Application No. PCT/US2013/049562 mailed Nov. 28, 2013.
Written Opinion of the International Searching Authority for International Application No. PCT/US2013/049562 mailed Nov. 28, 2013.
U.S. Appl. No. 13/006,524; Final Office Action; filed Jan. 14, 2011; Date Mailed: Jul. 31, 2014; 29 pages.
U.S. Appl. No. 13/006,455; Non Final Office Action; filed Jan. 14, 2011; Date Mailed: Jun. 19, 2014; 23 pages.
Chinese Office Action for Chinese Application Serial No. 201180004747.9, Mailed Jul. 1, 2014; 9 pages.
Japanese Office Action for Japanese Serial No. 2012-550055 mailed Jul. 15, 2014, 9 pages.
CN Office Action Dated Apr. 30, 2014 RE CN Patent Appln No. 2011800064084; 4 pages.
Chinese First Office Action and Search Report for Application No. 2011800005129.6; Issued Nov. 18, 2013.
Moog Components Group; "Fiber Optic Rotary Joints; Product Guide" (4 pages) Dec. 2010; Moog, Inc. 2010.
Moog Components Group "Technical Brief; Fiber Optic Rotary Joints" Document No. 303 (6 pages) Mar. 2008; Moog, Inc. 2008 Canada; Focal Technologies.
International Search Report dated Nov. 28, 2013 for International Application No. PCT/13/049562 filed Jul. 8, 2013 (7 pages).
Written Opinion of the International Search Authority dated Nov. 28, 2013 for International Application No. PCT/13/049562 filed Jul. 8, 2013 (10 pages).

\* cited by examiner

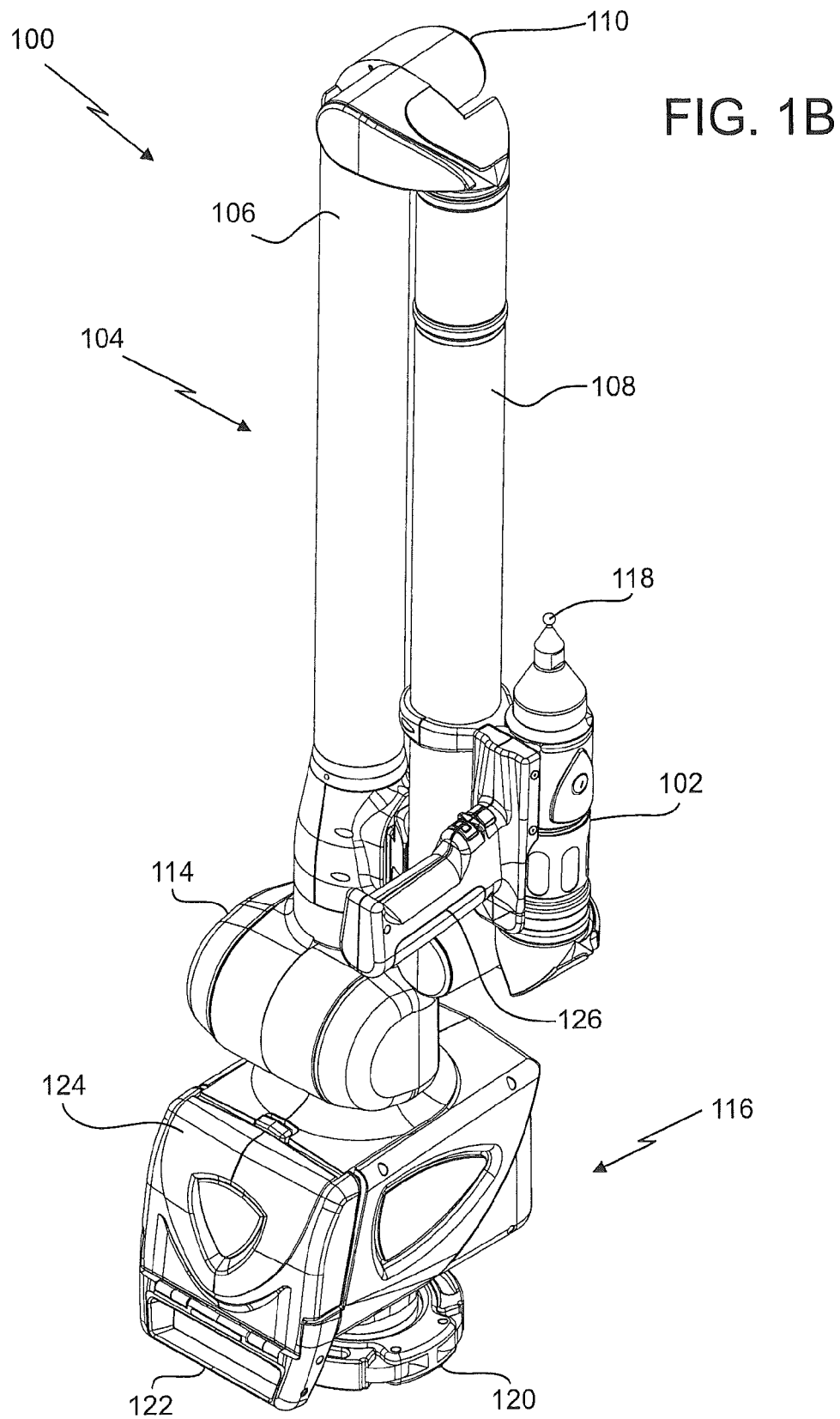

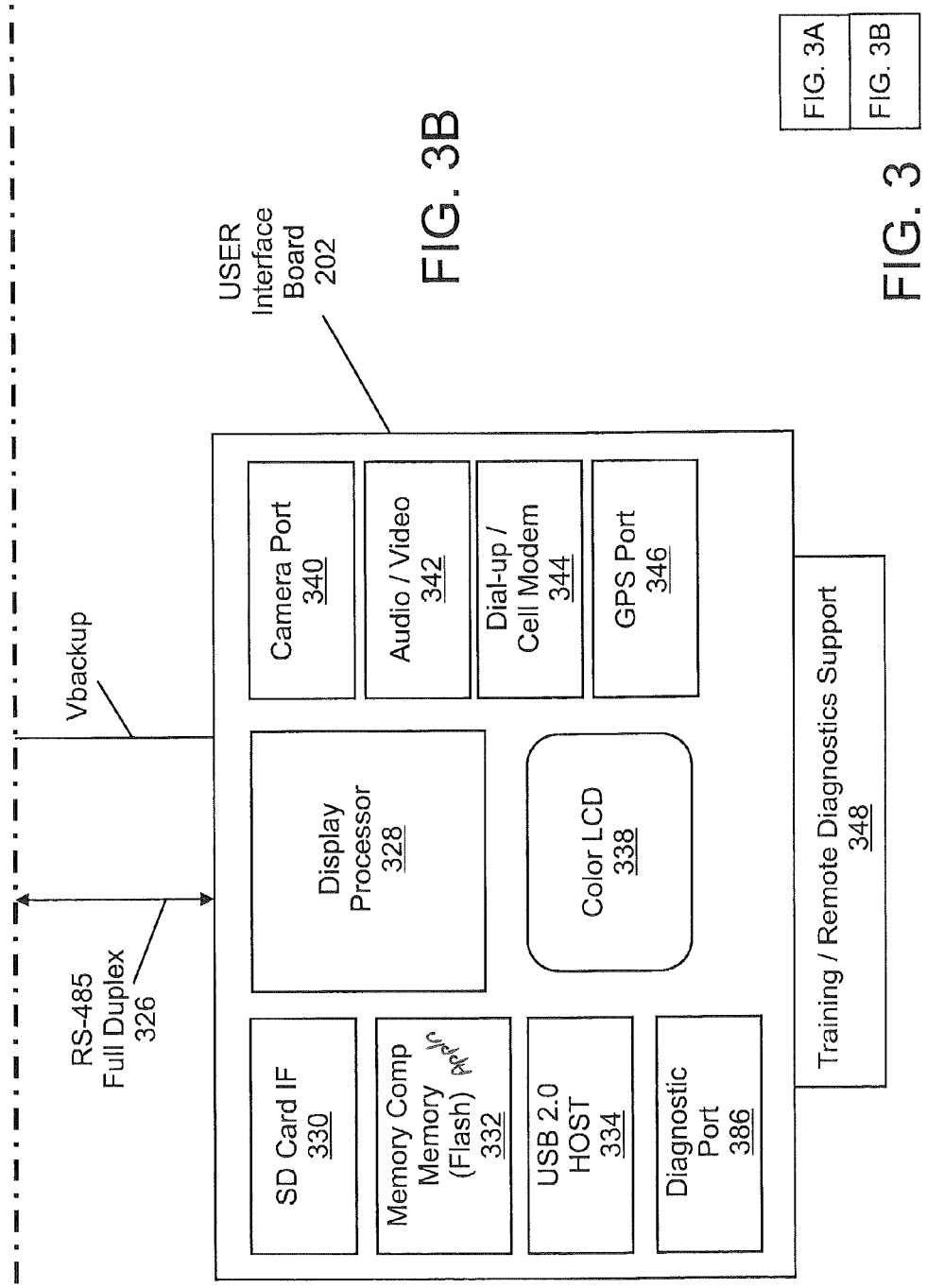

PORTABLE ARTICULATED ARM COORDINATE MEASURING MACHINE AND INTEGRATED ELECTRONIC DATA PROCESSING SYSTEM

CROSS-REFERENCE TO RELATED APPLICATIONS

The present application claims the benefit of provisional application No. 61/296,555 filed Jan. 20, 2010, the content of which is hereby incorporated by reference in its entirety.

BACKGROUND

The present disclosure relates to a coordinate measuring machine, and more particularly to a portable articulated arm coordinate measuring machine having an onboard electronic data processing system and user interface.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Currently, articulated arm CMMs are controlled by an operator that communicates with the CMM to direct the CMM to gather data which is then processed by a computer processor. To enhance functionality, what is needed is an AACMM that includes an integrated electronic data processing system that enables access by multiple users and associated computer devices without interruption of the underlying data acquisition and processing functionality.

SUMMARY OF THE INVENTION

An embodiment is a method of implementing a portable articulated arm coordinate measuring machine (AACMM). The method includes receiving a first request to perform a function. The portable AACMM includes a manually positionable articulated arm portion having opposed first and second ends, the arm portion including a plurality of connected arm segments, each arm segment including at least one position transducer for producing a position signal, a measurement device attached to a first end of the AACMM, and an electronic circuit which receives the position signals from the transducers and provides data corresponding to a position of the measurement device. The method also includes identifying a source device from which the first request is received, implementing the function pursuant to the first request, selecting a destination device as the source device of the first request by identifying from which of a first and second port the first request is received, and transmitting information derived from implementing the function to the destination device.

Another embodiment is a portable articulated arm coordinate measuring machine (AACMM). The portable AACMM includes a manually positionable articulated arm portion having opposed first and second ends, the arm portion including a plurality of connected arm segments, each of the arm segments including at least one position transducer for producing a position signal, a measurement device attached to a first end of the AACMM, an electronic circuit for receiving the position signals from the transducers and for providing data corresponding to a position of the measurement device, and logic executable by the electronic circuit. The logic receives a first request to perform a function, identifies a source device from which the first request is received, implements the function pursuant to the first request, selects a destination device as the source device of the first request by identifying from which of a first and second port the first request is received, and transmits information derived from implementing the function to the destination device.

A further embodiment is a computer program product for implementing a portable articulated arm coordinate measuring machine (AACMM). The computer program product includes a computer storage medium having computer-readable program code embodied thereon, which when executed by a computer cause the computer to implement a method. The method includes receiving a first request to perform a function. The portable AACMM includes a manually positionable articulated arm having opposed first and second ends, the arm including a plurality of connected arm segments, each arm segment including at least one position transducer for producing a position signal, a measurement device attached to a first end of the AACMM, and an electronic circuit which receives the position signals from the transducers and provides data corresponding to a position of the measurement device. The method also includes identifying a source device from which the first request is received, implementing the function pursuant to the first request, selecting a destination device as the source device of the first request by identifying from which of a first and second port the first request is received, and transmitting information derived from implementing the function to the destination device.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including FIGS. 1A and 1B, are perspective views of a portable articulated arm coordinate measuring machine (AACMM) having embodiments of various aspects of the present invention therewithin;

DETAILED DESCRIPTION

A portable articulated arm coordinate measuring machine (AACMM) and integrated electronic data processing system are provided in accordance with exemplary embodiments. The electronic data processing system resides onboard, and is integrated with, the AACMM and its components. The electronic data processing system includes a base computer processor and display processor, which perform user-selected functions in response to requests received via the AACMM. In an embodiment the requests may be received at the AACMM via an onboard user interface board and/or an external computer processor that is remotely located from the AACMM. In response to the requests, various components, e.g., encoders, sensors, and electronics collect data responsive to the requests. Information derived by the data is forwarded to a destination device as described further herein.

Figure 1A:
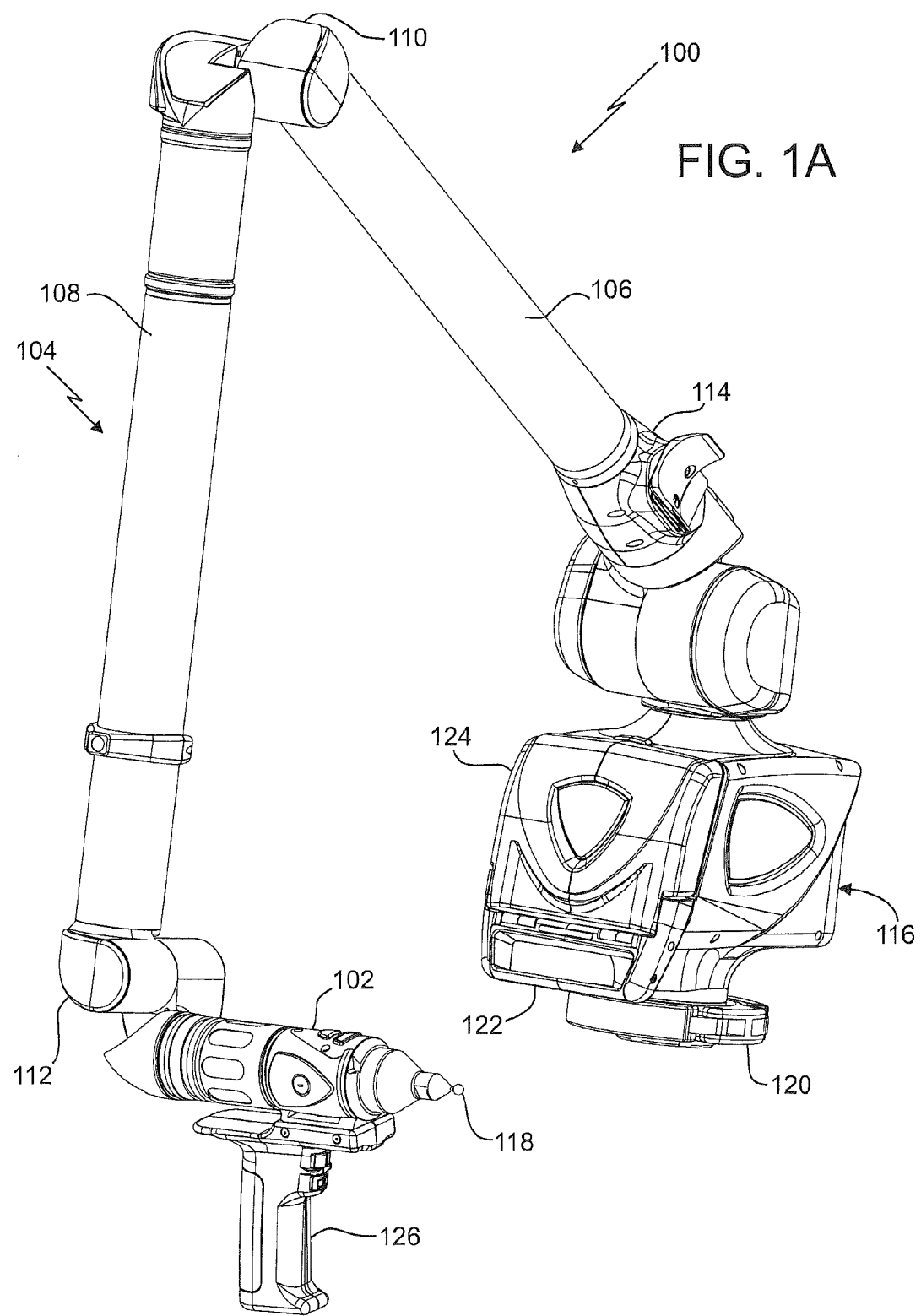

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118 and/or a peripheral device, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical encoder system). The encoder system (i.e., transducer) provides an indication of the position of the respective arm segments 106, 108 and corresponding bearing cartridge groupings 110, 112, 114, that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
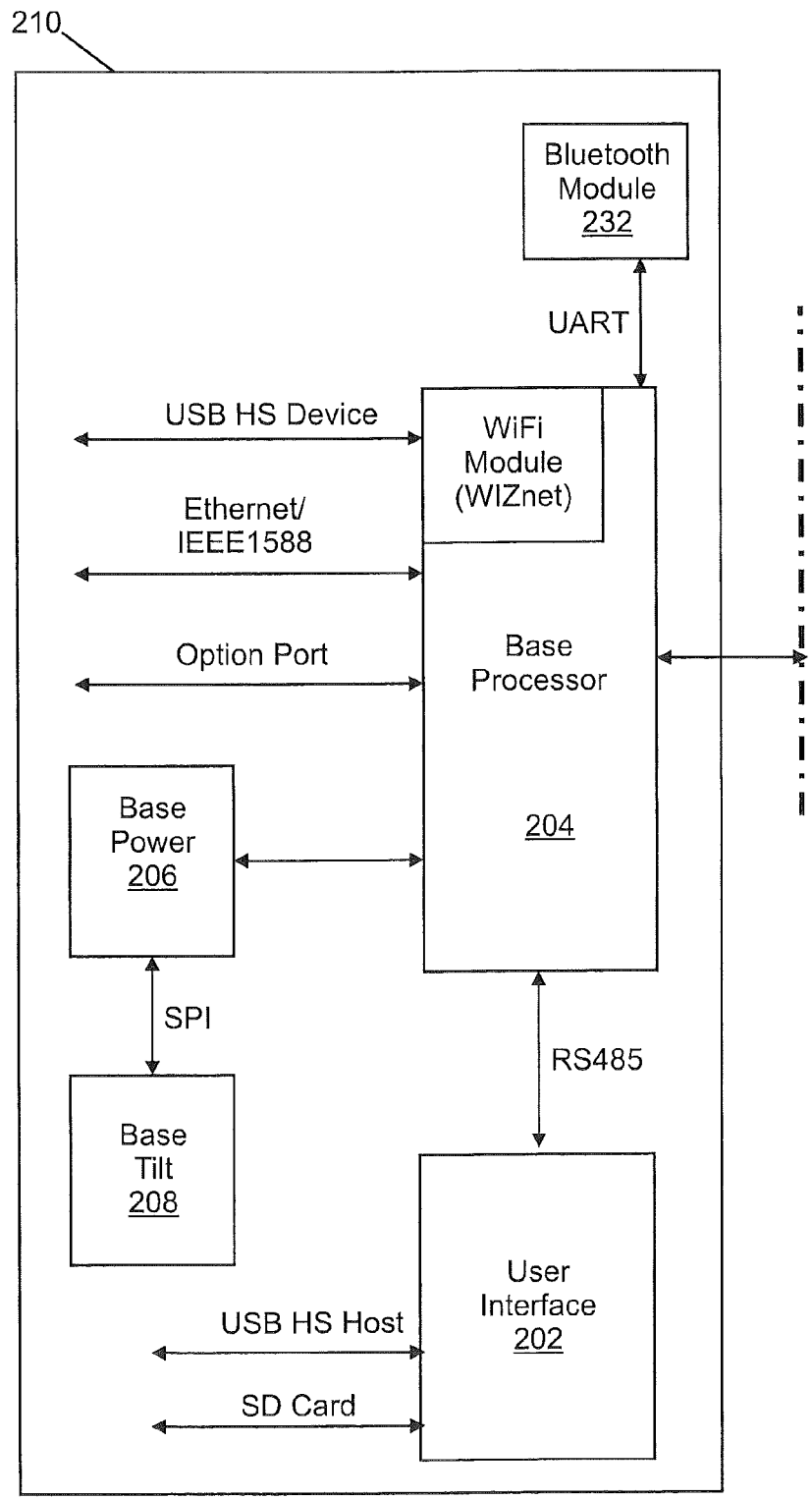
FIG. 2, including FIGS. 2A-2D taken together, is a block diagram of electronics utilized as part of the AACMM of FIG. 1 in accordance with an embodiment.
Figure 2B:
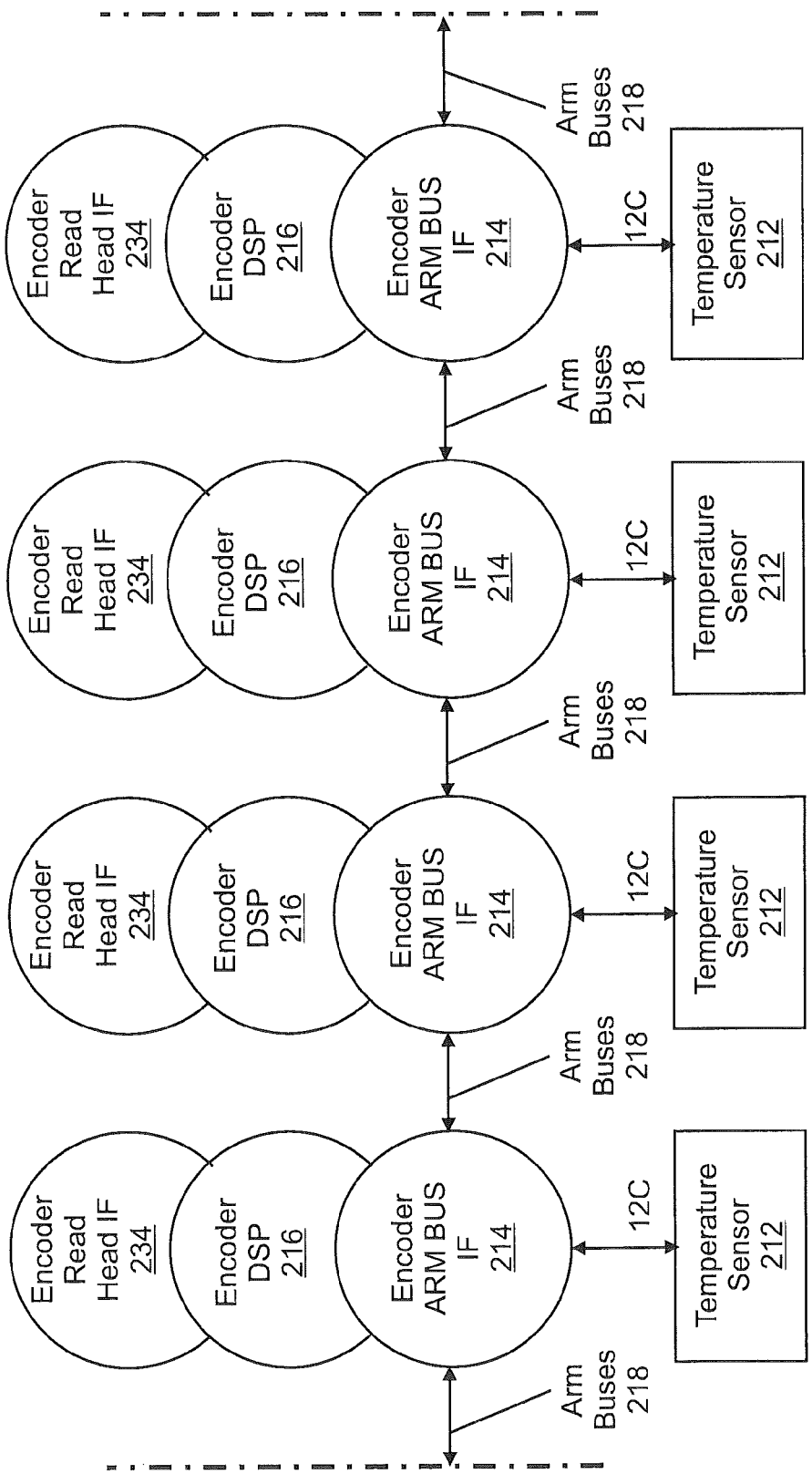
Figure 2C:
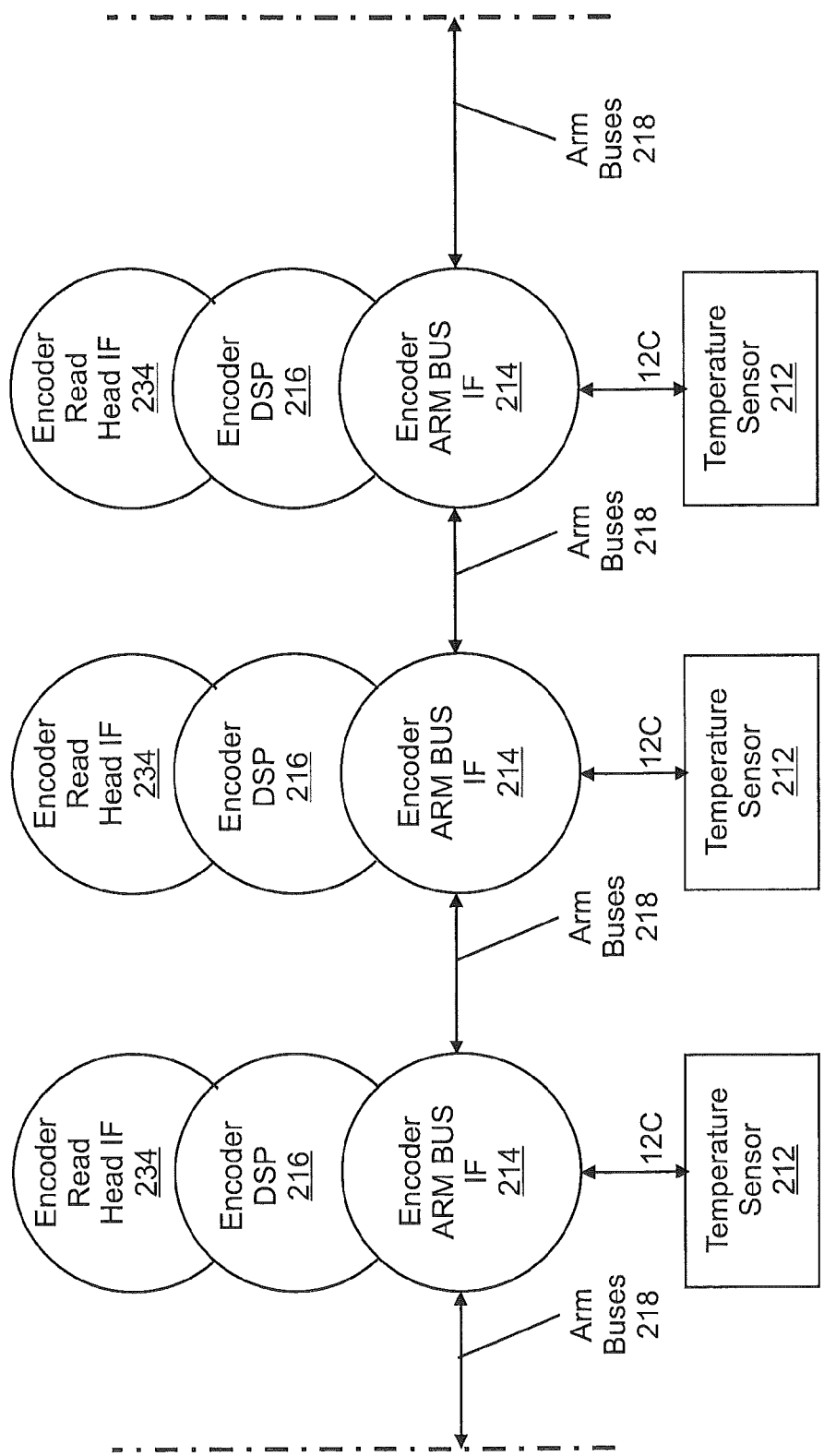
Figure 2D:
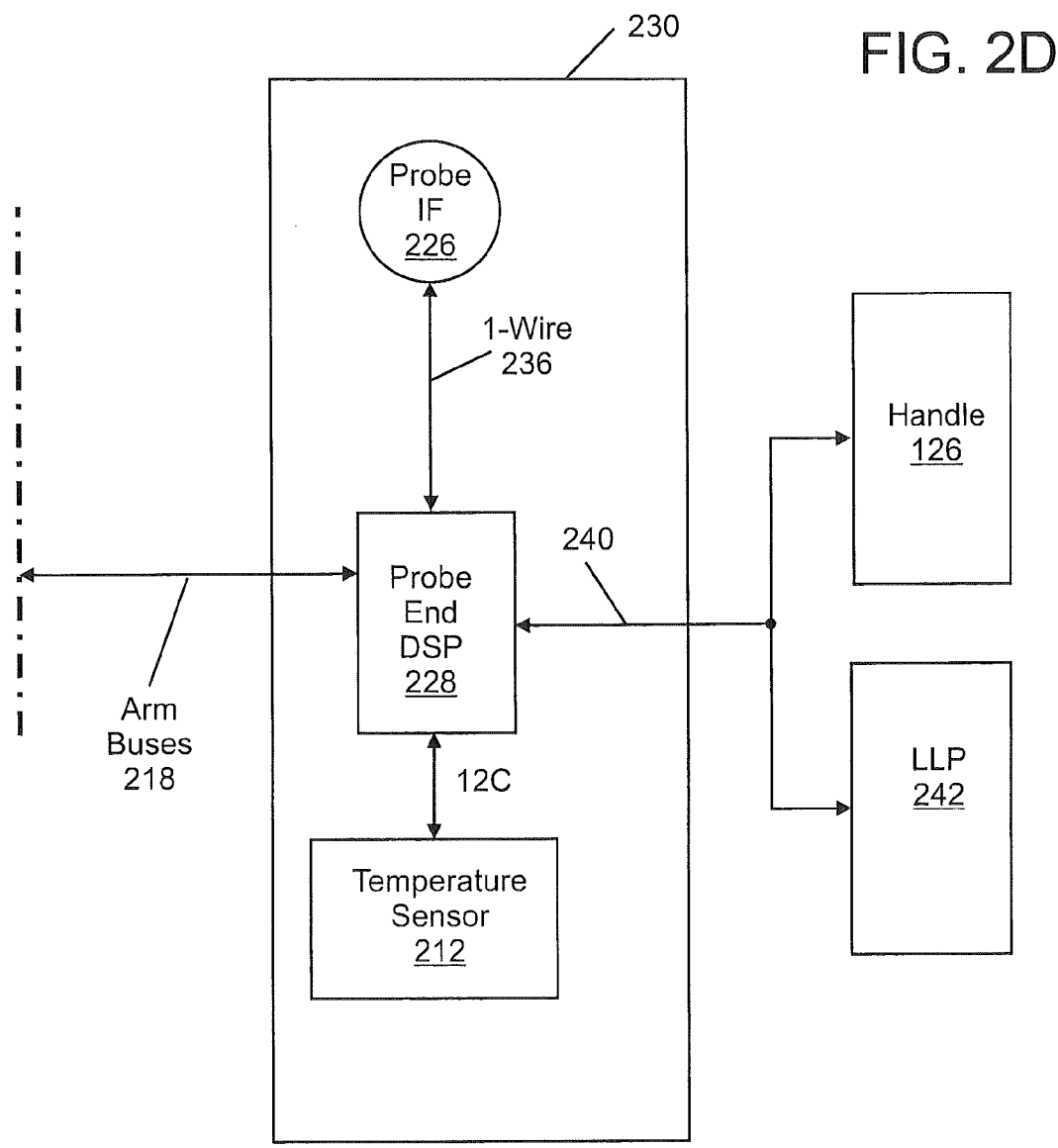
Figure 2:
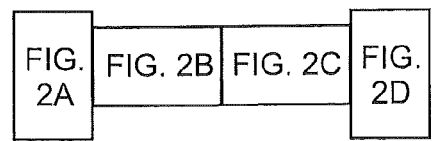

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

Figure 3A:
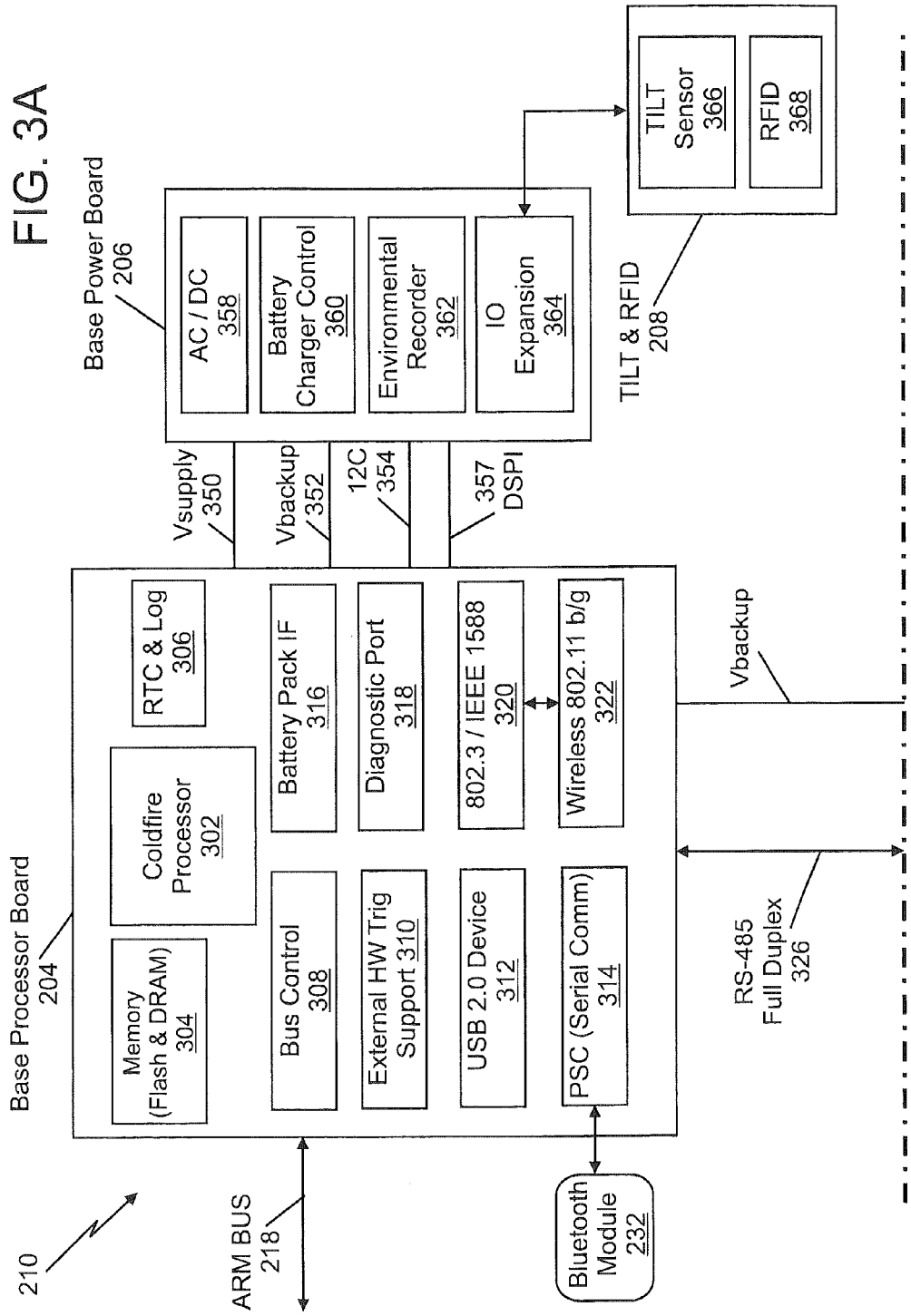
FIG. 3, including FIGS. 3A and 3B taken together, is a block diagram describing detailed features of the electronic data processing system of FIG. 2 in accordance with an embodiment.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

In an embodiment, the AACMM 100 includes the integrated electronic data processing system 210 described above. The electronic data processing system 210 resides onboard, and is integrated with, the AACMM 100 and its components. The base processor board 204 includes a base computer processor, which may be implemented by the processor function 302 illustrated in FIG. 3. The electronic data processing system 210 performs user-selected functions in response to requests received via the AACMM 100, which functions are described further herein. In an exemplary embodiment, the functions are performed via one or more applications (e.g., logic) executed by the electronic data processing system 210 and stored, e.g., in memory 304 and/or memory 332 of FIG. 3. In an embodiment, the requests may be received at the AACMM 100 via the onboard user interface board 202 illustrated in FIG. 2 and/or an external computer processor that is remotely located from the AACMM 100 and communicates with the AACMM 100 either directly through a USB channel, over an Ethernet network, or wirelessly, e.g., over a wireless LAN or Bluetooth™-enabled channel 232, as illustrated generally in FIG. 2. In response to the requests, various components, e.g., encoder systems 214, 216, 234, probe end electronics 230, and/or peripheral devices (e.g., LLP 242) acquire data responsive to the requests. Information derived by the data is returned to the electronic data processing system 210, and forwarded to one or more destination devices as described further herein.

Referring to FIGS. 1-4, an embodiment is shown of the AACMM 100 having an integrated display. The AACMM 100 includes the base 116 that includes the electronic data processing system 210 and which is arranged to communicate via one or more buses (e.g., arm buses 218) with the encoder systems associated with the bearing cartridge groupings 110, 112, 114. The base 116 includes a housing 400 with the mounting device 120 on one end and the bearing cartridge grouping 114 and arm portion 104 on an opposite end. The housing 400 includes the handle portion 122 that is sized to facilitate the carrying of the AACMM 100 by the operator.

In one embodiment, the housing 400 includes an opening 410 sized to receive a battery 412 for providing electrical power for the AACMM 100 when the AACMM 100 is not connected to an external power source (e.g. a wall outlet). In an embodiment, the battery 412 includes circuitry that communicates with the electronic data processing system 210 and transmits signals that may include but are not limited to: battery charge level; battery type; model number; manufacturer; characteristics; discharge rate; predicted remaining capacity; temperature; voltage; and an almost-discharged alarm so that the AACMM can shut down in a controlled manner.

The movable cover portion 124 includes a housing 404 that is mounted to the base 116, e.g., by hinges. During operation of the AACM 100, the movable cover portion 124 may be opened to allow viewing of a display screen 406.

Arranged within the movable cover portion 124 is a display 408 having the display screen 406 (e.g., color LCD 338 of FIG. 3B). The display 408 provides a user interface that allows the operator to interact and operate the AACMM 100 without the need to connect to an external host computer. In one embodiment, the display screen 406 is an LCD screen that can detect presence and location of a touch, such as by the operator's finger or a stylus for example, within the display area. The display 408 may include a touch screen having elements for detecting the touch that include but not limited to: resistive elements; surface acoustic wave elements; capacitive elements; surface capacitance elements; projected capacitance elements; infrared photodetector elements; strain gauge elements; optical imaging elements; dispersive signal elements; or acoustic pulse recognition elements.

The user interface board 202 (FIGS. 2 and 3) is electrically coupled to the display 408 and to the base processor board 204 (FIGS. 2 and 3) within the base 116.

In one embodiment, the housing 404 of the cover portion 124 further includes a pair of computer interfaces 414, 416 that allow the operator to connect the user interface board 202 to an external device such as but not limited to: a computer; a computer network; a laptop; a barcode scanner; a digital camera; a digital video camera; a keyboard; a mouse; a printer; a personal digital assistant (PDA); or a smart phone for example. In one embodiment, the computer interface 414 is the USB host interface 334, and the computer interface 416 is the secure digital card interface 330. As discussed above, the user interface board 202 includes a processor 328 that is arranged in bi-directional communication to accept and transmit signals from the display screen 406 and the electronic data processing system 210.

Figure 5:
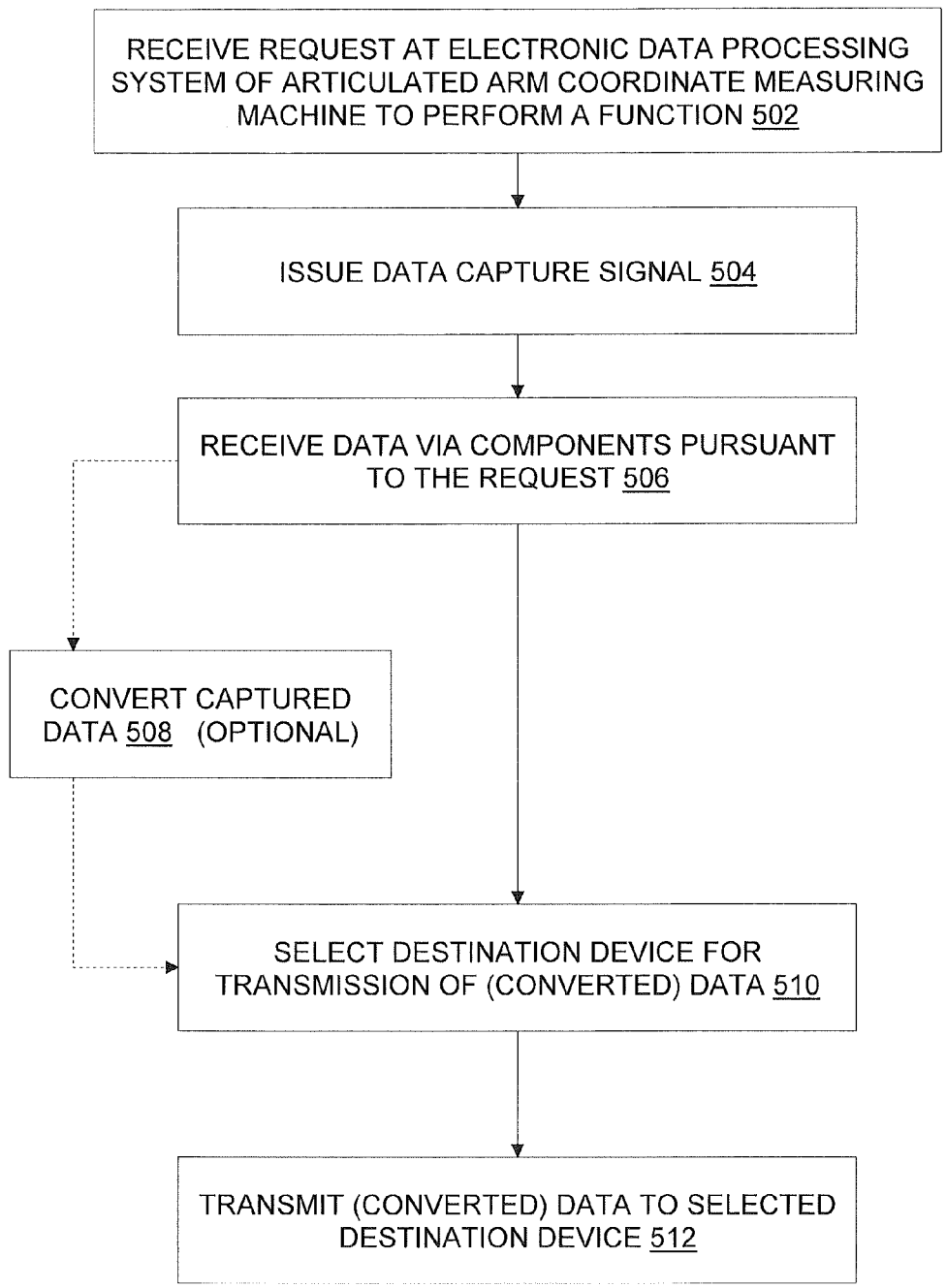
FIG. 5 is a flow diagram describing a process for implementing onboard electronic data processing system features of the AACMM in accordance with an embodiment.

Turning now to FIG. 5, a process for implementing the AACMM 100 and integrated electronic data processing system 210 will now be described in an embodiment. As indicated above, the electronic data processing system 210 implements logic for executing the processes described in FIG. 5. The logic may be stored at the user interface board 202, e.g., in memory 332.

At step 502, the electronic data processing system 210 receives a request from one or more source devices to perform a function. Functions available for implementation may include acquisition of dimensional measurements (such as measurement of point coordinates) of an object through a probe device of the AACMM 100 (e.g., probe 118), monitoring various temperature values (e.g., through one or more temperature sensors 212), performing calibration of one or more components of the AACMM 100, performing diagnostics on one or more of the components of the AACMM 100, and training guidance, to name a few. If the function includes the measurement of point coordinates of an object, components used in the data capture include one or more encoder systems (e.g., encoder systems 214, 216, 234) disposed on a bearing cartridge grouping 110, 112, 114 of the AACMM 100 and the base computer processor, which receives raw measurement data captured from the encoder(s). Other functions available may be implemented in response to a request from a removable accessory or peripheral device, such as a camera, LLP 242, radio frequency identification device (RFID) scanner, thermal scanning device, etc. Source devices may include an external computer processor, an onboard user interface component (e.g., onboard user interface board 202 and display 338 of FIGS. 2 and 3), or other communications device (e.g., smart telephone, personal digital assistant, etc.).

The electronic data processing system 210 identifies the source device from which the request is sent (e.g., identifying a port from which the request is received via the logic). If the source device is the external computer processor, the port identified may be the USB port, an Ethernet port, or a wireless communications port (e.g., a wireless port 232 supporting Bluetooth™ protocols or port 322 supporting 802.11 protocols), as shown in FIGS. 2 and 3. If the source device is the user interface component (e.g., via the user interface board 202) that is onboard the AACMM 100, the port identified may be an RS485 supported port.

In one embodiment, the request is received at the base computer processor (e.g., processor 302 of FIG. 3) from a peripheral component via an arm bus 218 and general purpose interface (e.g., if the peripheral component is LLP 242, the request may be received as an interrupt signal passed through handle interface bus 240 via button presses and along the arm bus 218, as shown in FIG. 2D). In one embodiment, the external computer processor is remotely located from the AACMM 100.

Figure 4:
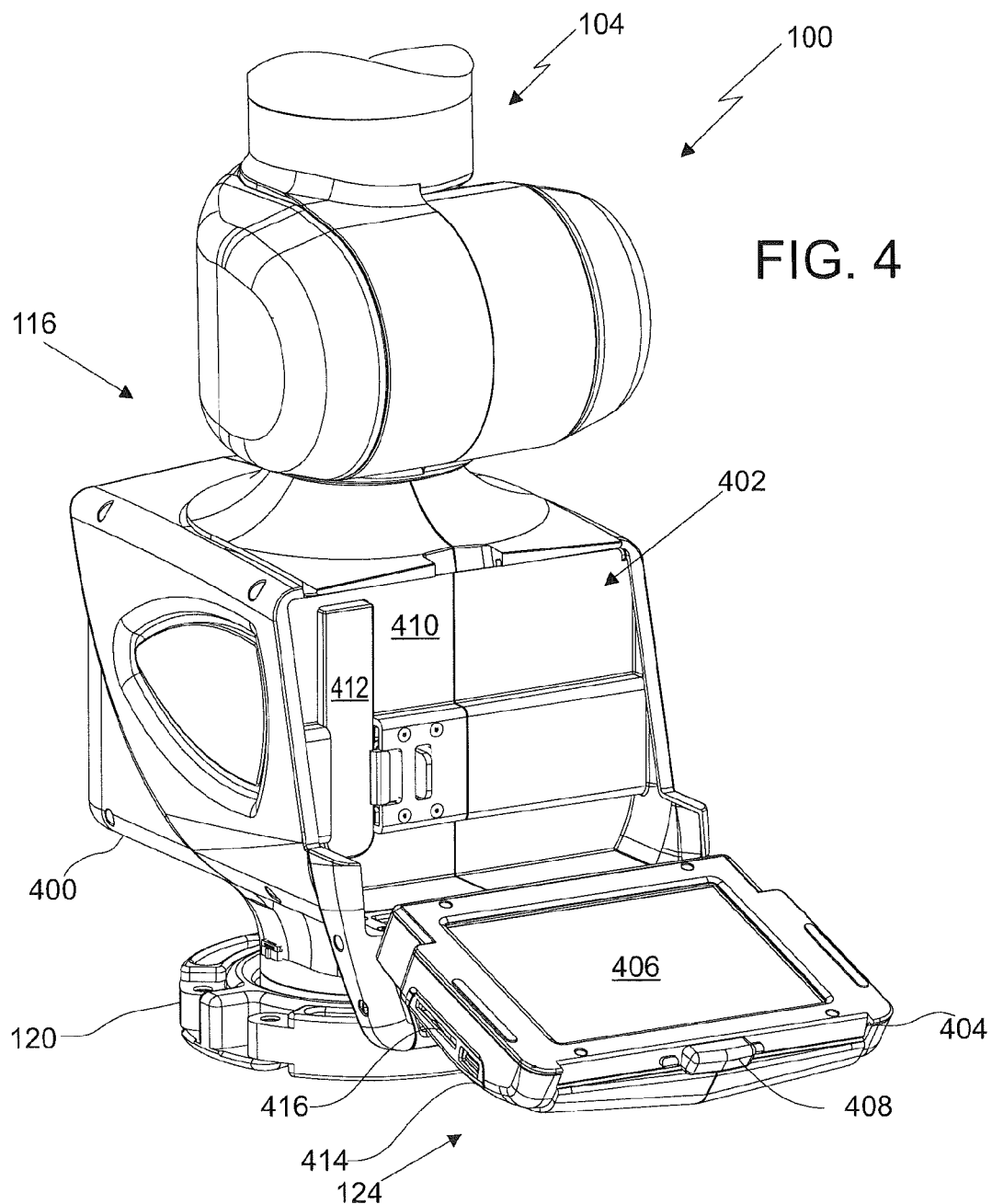
FIG. 4 is a perspective view of the AACMM of FIG. 1 with a display arranged in an open position in accordance with an embodiment.
Figure 6:
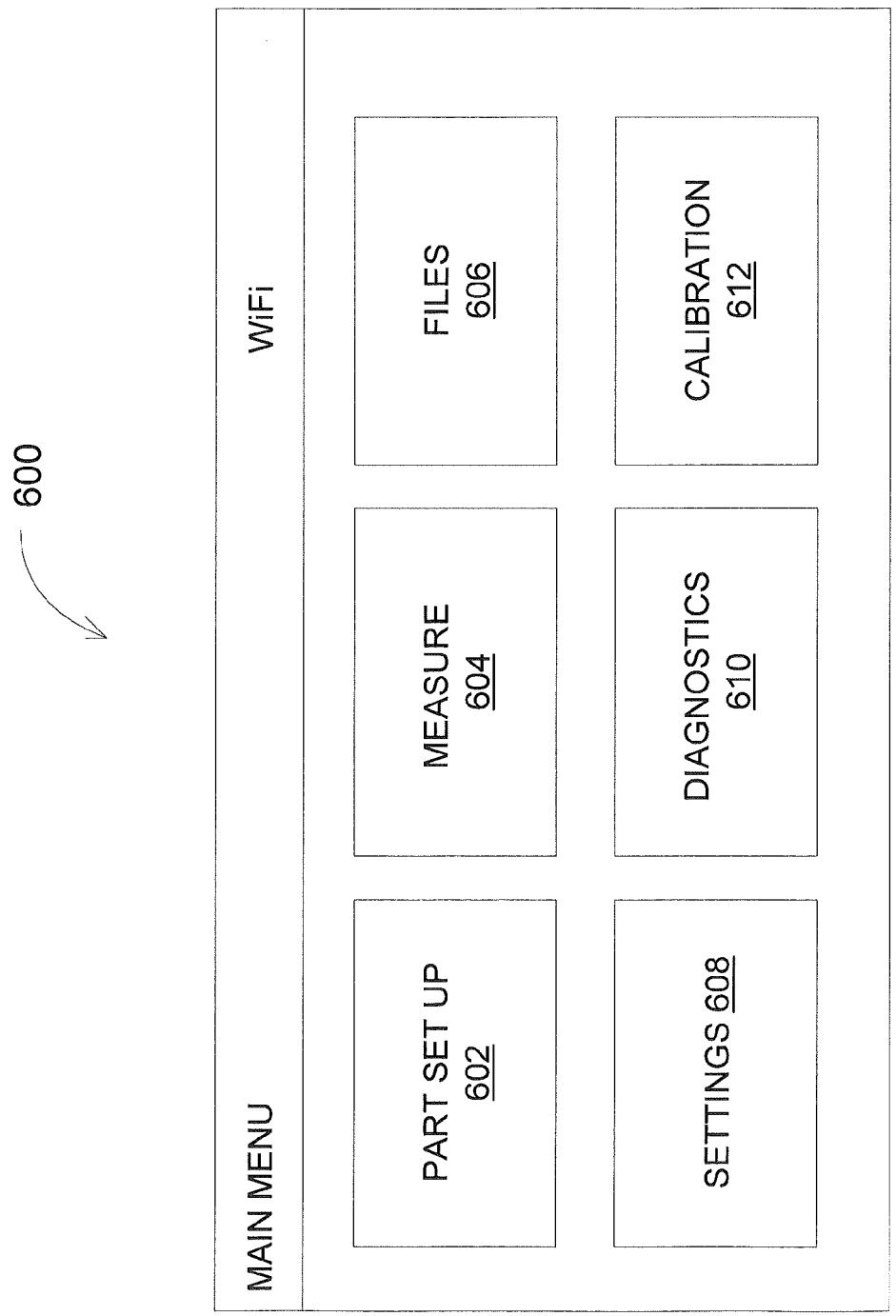
FIG. 6 is a user interface computer screen window of the display of FIG. 4 in accordance with an embodiment.

If the request is received from the user interface component (e.g., via the user interface board 202) disposed onboard the AACMM 100, the request may be input by an operator of the AACMM 100 via the user interface display 338 (also shown as display screen 406 of FIG. 4). In an embodiment, the user interface board 202 includes resident applications (e.g., stored in the memory 332) and executed by the display processor 328 for providing a graphical user interface (GUI) with selectable menu options corresponding to the available functions implemented by the AACMM 100. The GUI may be implemented as a set of menu options, such as those shown in FIG. 6. In FIG. 6, a computer screen window 600 of the display screen 406 illustrates various menu options, such as Part Setup 602 (e.g., for specifying part elements such as planes, lines, circles, cylinders), Measure 604 (e.g., for specifying features, lengths, angles, positions, etc.), Files 606 (e.g., for defining new parts, loading macros, transferring data, etc.), Settings 608 (e.g., for specifying network connections, languages, sound elements, etc.), and Diagnostics 610.

Returning to step 502, in response to the request to perform a function, the electronic data processing system 210 issues a data capture signal via the logic at step 504. For example, if the function requested is a request for probe 118 measurements, the base computer processor issues a data capture signal to the encoder DSPs 216 and probe end DSP 228 via the arm bus 218. If the AACMM 100 employs a touch probe, the data capture signal may be initiated by the touch probe in response to positioning the touch probe in contact with an object to be measured. The encoder DSPs 216 and the probe end DSP 228 capture (or latch) data (e.g., encoder counts and temperature) in response to receiving the capture signal. If the function requested is a request for data from a peripheral component that is communicatively coupled to the AACMM 100 (e.g., a removably attached peripheral component), the base computer processor issues a data capture signal either across the arm bus 218 to the peripheral component, or it may issue a data capture signal wirelessly to the peripheral component if the peripheral component is equipped with wireless communication components. In an embodiment, the data from a peripheral component is latched and sent over the arm buses 218 to the base computer processor. For example, the peripheral component (e.g., LLP 242) may include a controller and DSP. The data is latched by the DSP in the LLP 242 and then is put onto the arm bus 218 for transport to the base computer processor.

At step 506, the base computer processor receives the data resulting from the data capture signal. For example, if the requested function is for probe measurement data, the base computer processor polls the encoder DSPs 216 and probe end DSP 228 in sequence for the latched data (e.g., sends packets with encoder addresses requesting the position data). If the requested function is for peripheral component data, the data captured may include, e.g., image data (where the peripheral component is a camera), multimedia data (where the accessory is a video recorder), RFID data (where the peripheral component is an RFID scanner), and two-dimensional center of gravity (COG) data (where the accessory is an LLP). In one embodiment, the peripheral component data may also include identifying information that identifies the peripheral component data type (e.g., JPEG, MPEG, AVI, etc.). The data may be received at the base computer processor via the arm bus 218 or the data may be transmitted wirelessly between the peripheral component and the base computer processor.

In an embodiment, steps 502 through 506 are performed continuously while the AACMM 100 is in operation. In addition, if a touch probe is connected to the AACMM, the touch probe can initiate the issuance of a trigger signal (e.g., when the probe tip comes in contact or near contact with an object). When a touch probe initiates the signal, it interrupts the current cycle of steps 502 through 506 and causes processing to resume at step 502

At step 508, the captured data is optionally converted to a different format. For example, if the captured data is raw measurement data, the captured data may be converted to three-dimensional coordinate data.

At step 510, the electronic data processing system 210 selects a destination device to transmit the data (optionally, the converted data). In an embodiment, the electronic data processing system 210 selects the destination device via the logic by identifying the port from which the request is received. As indicated above, if the destination device is the external computer processor, the port identified may be the USB port, an Ethernet port, or a wireless communications port (e.g., a wireless port 232 supporting Bluetooth™ protocols), as shown in FIG. 2. If the destination device is the user interface component (e.g., the user interface board 202) that is onboard the AACMM 100, the port identified may be an RS485 supported port. Alternatively, the logic may be configured to transmit the data to multiple destination devices, including the device from which the request was sent.

At step 512, the data is transmitted to one or more selected destination devices, such as the external computer and the onboard display 406. In other embodiments, the destination device may be a smart phone, PDA, or other communication device.

As described above in FIG. 5, additional functions may be implemented via the electronic data processing system 210 (e.g., calibration, training, etc.). If the request of step 502 is for calibration, the processes performed are similar to those described with respect to FIG. 5. The request for calibration may be initiated via an external computer with associated software applications, or may be initiated through the user interface components integrated into the AACMM 100 via the user interface board 202 (e.g., through menu option 612 of FIG. 6). The calibration feature 612 of the user interface component guides the operator of the AACMM 100 to move the probe or peripheral device in a particular pattern, the data is captured in a manner described above in accordance with the type of measurement device (e.g., probe versus LLP), and the data is processed by the logic executing on the display processor 328 or the external computer, depending upon which device initiated the request for the calibration function. The logic processes the data to determine if the calibration is successful.

In an exemplary embodiment, the AACMM 100 may be configured to provide multiple, simultaneous access to the coordinate measuring machine features. For example, a remote user of the AACMM 100 (e.g., via a computer device) may initiate acquisition of data or measurements from the AACMM 100 through the base computer processor and logic. The AACMM 100 may begin collecting data in response to commands provided by the base computer processor. If an operator of the AACMM 100 desires to acquire, e.g., measurements of another aspect of the object being measured, the operator may activate the user interface board 202 and display by selecting from menu options available by the GUI described above. In an exemplary embodiment, the AACMM 100 is configured to receive, through the base computer processor and logic, commands from both the user interface board 202 as well as from external sources, such as the remote computer device. The AACMM 100 may be instructed through the base processor board 204 to pause acquisition of data collection from the remote computer device in order to gather data pursuant to the instructions received via the user interface board 202 and GUI. The data gathered in response to the request from the remote computer device may be stored or temporarily buffered in order to begin collecting data for the operator at the AACMM 100. Once the operator has completed the requested measurements, the AACMM 100 is configured to resume measurements in response to the instructions earlier received from the remote computer device. In this embodiment, the gathered data may be transmitted to the corresponding device that requested the data, or the logic may be configured to transmit all gathered data to any device that is in communication with the AACMM 100. Thus, e.g., the external computer may receive gathered data requested by an operator through the onboard user interface.

In one embodiment, two requests for measurements may be processed by the electronic data processing system 210 at the same time. For example, a request from the external computer for probe 118 measurements may be implemented simultaneous with a request from the onboard user interface for LLP device 242 measurement data. The AACMM 100 arm buses 218 may be configured such that data acquired through operation of one device (e.g., the probe 118) may be transmitted on one bus, while data acquired through operation of another device (e.g., the LLP 242) may be transmitted along another bus. The data from one device may be temporarily buffered while the logic processes the data from the other device.

Technical effects and benefits include integrated functionality of an AACMM 100 and the electronic data processing system 210, which resides onboard, and is integrated with, the AACMM and its components. Because the functions of the electronic data processing system are integrated into the base of the AACMM, no external computer is needed to operate or control the AACMM. If an external computer is desired in the operation of the AACMM, the AACMM integrates base computer processing functionality that enables communication between the AACMM and the external computer as well as communication through an onboard user interface for communicating with an operator of the AACMM separately from the communications conducted with the external computer processor. The data streams to each of the external computer processor and the user interface are separately buffered so one stream can be interrupted without affecting the other. The base computer processor identifies source devices of requests for functions to be performed by the AACMM and transmits captured data resulting from these requests to the identified devices, referred as destination devices. Thus, the AACMM enables access by multiple users and associated computer devices without interruption of the underlying data acquisition and processing functionality.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM, Flash or Phase-change memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of implementing a portable articulated arm coordinate measuring machine (AACMM), comprising:

receiving, by a computer processor of the portable AACMM, a first request to perform a first function, the portable AACMM comprised of a manually positionable arm portion having opposed first and second ends, the arm portion including a plurality of connected arm segments, each arm segment including at least one position transducer for producing a position signal, a measurement device attached to a first end of the AACMM, and an electronic circuit which receives the position signals from the transducers and provides data corresponding to a position of the measurement device;

identifying a source device from which the first request is received;

implementing, by the computer processor, the first function pursuant to the first request;

receiving, by the computer processor, a second request to perform a second function during performance of the first function;

identifying a source device from which the second request is received;

pausing implementation of the first function and storing data acquired from the implementation of the first function in a memory location of the portable AACMM;

selecting a destination device as the source device of the second request;

transmitting, by the computer processor, information derived from implementing the second function to the destination device corresponding to the second request; and continuing implementation of the first function, including:

selecting a destination device as the source device of the first request by identifying from which of a first and second port the first request is received; and transmitting, by the computer processor, information derived from implementing the first function to the destination device as the source device of the first request.

2. The method of claim 1, wherein the first function includes acquisition of dimensional measurements of an object; and wherein the transmitting information derived from implementing the first function includes at least one of:

transmitting raw measurement data to the destination device as the source device of the first request; and converting the raw measurement data to three-dimensional coordinate data that comprises the information prior to the transmitting information derived from implementing the first function.

3. The method of claim 1, wherein the first request includes a request to capture data from a peripheral device communicatively coupled to the portable AACMM, the method further comprising transmitting the captured data from the peripheral component via a bus to the electronic circuit.

4. The method of claim 3, wherein the peripheral component comprises at least one of a:

laser line probe;

thermal scanning device;

radio frequency identification device scanner; and camera.

5. The method of claim 1, wherein the first function includes at least one of:

monitoring temperature values via a temperature sensor disposed on the portable AACMM;

performing calibration of at least one component of the portable AACMM; and performing diagnostics on at least one component of the portable AACMM.

6. The method of claim 1, wherein the first request is received at the electronic circuit from at least one of a user interface component onboard the portable AACMM via the first port on the electronic circuit and an external computer processor via the second port on the electronic circuit, the external computer processor remotely located from the portable AACMM.

7. A portable articulated arm coordinate measuring machine (AACMM), comprising:
 a manually positionable arm portion having opposed first and second ends, the arm portion including a plurality of connected arm segments, each of the arm segments including at least one position transducer for producing a position signal;
 a measurement device attached to a first end of the AACMM;
 an electronic circuit for receiving the position signals from the transducers and for providing data corresponding to a position of the measurement device; and
 logic executable by the electronic circuit, wherein the logic receives a first request to perform a first function, identifies a source device from which the first request is received, implements the first function pursuant to the first request, receives a second request to perform a second function during performance of the first function, identifies a source device from which the second request is received, pauses implementation of the first function and stores data acquired from the implementation of the first function in a memory location of the portable AACMM, selects a destination device as the source device of the second request, transmits information derived from implementing the second function to the destination device corresponding to the second request, and continues implementation of the first function, the implementation continued by selecting a destination device as the source device of the first request by identifying from which of a first and second port the first request is received, and transmitting information derived from implementing the first function to the destination device as the source device of the first request.

8. The portable AACMM of claim 7, wherein the first function includes acquisition of dimensional measurements of an object; and
 wherein transmitting the information derived from implementing the first function includes at least one of: transmitting raw measurement data to the destination device as the source device of the first request, and converting the raw measurement data to three-dimensional coordinate data that comprises the information prior to the transmitting information derived from implementing the first function.

9. The portable AACMM of claim 7, wherein the first request includes a request to capture data from a peripheral device communicatively coupled to the portable AACMM, wherein the logic further transmits the captured data from the peripheral component via a bus to the electronic circuit;
 wherein the peripheral component comprises at least one of a:
 laser line probe;
 thermal scanning device;
 radio frequency identification device scanner; and
 camera.

10. The portable AACMM of claim 7, wherein the first function includes at least one of:
 monitoring temperature values via a temperature sensor disposed on the portable AACMM;
 performing calibration of at least one component of the portable AACMM; and
 performing diagnostics on at least one component of the portable AACMM.

11. The portable AACMM of claim 7, wherein the first request is received at the electronic circuit from at least one of a user interface component onboard the portable AACMM via the first port on the electronic circuit and an external computer processor via the second port on the electronic circuit, the external computer processor remotely located from the portable AACMM.

12. A computer program product for implementing a portable articulated arm coordinate measuring machine (AACMM), the computer program product comprising a non-transitory computer storage medium having computer-readable program code embodied thereon, which when executed by a computer causes the computer to implement a method, the method comprising:
 receiving a first request to perform a first function;
 identifying a source device from which the first request is received;
 implementing the first function pursuant to the first request;
 receiving a second request to perform a second function during performance of the first function;
 identifying a source device from which the second request is received;
 pausing implementation of the first function and storing data acquired from the implementation of the first function in a memory location of the portable AACMM;
 selecting a destination device as the source device of the second request;
 transmitting information derived from implementing the second function to the destination device corresponding to the second request; and
 continuing implementation of the first function, including:
 selecting a destination device as the source device of the first request by identifying from which of a first and second port the first request is received; and
 transmitting information derived from implementing the first function to the destination device as the source device of the first request.

13. The computer program product of claim 12, wherein the first function includes acquisition of dimensional measurements of an object; and
 wherein the transmitting information derived from implementing the first function includes at least one of:
 transmitting raw measurement data to the destination device as the source device of the first request; and
 converting the raw measurement data to three-dimensional coordinate data that comprises the information prior to the transmitting information derived from implementing the first function.

14. The computer program product of claim 12, wherein the first request includes a request to capture data from a peripheral device communicatively coupled to the portable AACMM, the method further comprising transmitting the captured data from the peripheral component via a bus to the electronic circuit.

15. The computer program product of claim 14, wherein the peripheral component comprises at least one of a:
 laser line probe;
 thermal scanning device;
 radio frequency identification device scanner; and
 camera.

16. The computer program product of claim 12, wherein the first function includes at least one of:
- monitoring temperature values via a temperature sensor disposed on the portable AACMM;
- performing calibration of at least one component of the portable AACMM; and
- performing diagnostics on at least one component of the portable AACMM.

17. The computer program product of claim 12, wherein the first request is received at the electronic circuit from at least one of a user interface component onboard the portable AACMM via the first port on the electronic circuit and an external computer processor via the second port on the electronic circuit, the external computer processor remotely located from the portable AACMM.

* * * * *